United States Patent [19]
Merten et al.

[11] Patent Number: 5,927,479
[45] Date of Patent: Jul. 27, 1999

[54] CHAIN DRUM ARRANGEMENT FOR SCRAPER CHAIN CONVEYORS

[75] Inventors: Gerhard Merten; Bernd Steinkuhl, both of Lünen; Adam Klabisch, Dortmund, all of Germany

[73] Assignee: DBT Deutsche Bergbau-Technik GmbH, Germany

[21] Appl. No.: 08/909,593

[22] Filed: Aug. 12, 1997

[30] Foreign Application Priority Data

Aug. 17, 1996 [DE] Germany .............. 196 33 208
Jun. 13, 1997 [DE] Germany .............. 197 24 994

[51] Int. Cl.⁶ ............................... B65G 23/06
[52] U.S. Cl. .................. 198/834; 198/835; 474/95; 474/96
[58] Field of Search .................. 198/834, 835; 474/95, 96

[56] References Cited

U.S. PATENT DOCUMENTS

| | | |
|---|---|---|
| 3,159,047 | 12/1964 | Dable ........................... 474/95 |
| 4,037,713 | 7/1977 | Soliman et al. ............ 198/834 |
| 4,372,619 | 2/1983 | Braun . |
| 4,501,447 | 2/1985 | Tatton et al. . |
| 5,131,723 | 7/1992 | Roling . |
| 5,161,858 | 11/1992 | Braun et al. . |
| 5,272,289 | 12/1993 | Cocksedge . |
| 5,389,044 | 2/1995 | Bandy, Jr. et al. ............. 474/95 |
| 5,547,262 | 8/1996 | Braun et al. . |
| 5,580,135 | 12/1996 | Braun et al. . |

FOREIGN PATENT DOCUMENTS

| | | |
|---|---|---|
| 2523639 | 9/1983 | France . |
| 2829011 | 11/1979 | Germany . |
| 2914861 | 10/1980 | Germany . |
| 2938408 | 4/1981 | Germany . |
| 2938446 | 4/1981 | Germany . |
| 2953955 | 10/1983 | Germany . |
| 3622110 | 1/1988 | Germany . |
| 3639133 | 5/1988 | Germany . |
| 4234282 | 4/1994 | Germany . |
| 9403731 | 7/1994 | Germany . |
| 4423925 | 1/1996 | Germany . |

*Primary Examiner*—Kenneth Noland
*Assistant Examiner*—Mark Deuble
*Attorney, Agent, or Firm*—Vickers, Daniels & Young

[57] ABSTRACT

A chain drum arrangement for a central or double central scraper chain conveyor which includes a divided chain wheel and shell-type chain wheel segments which are attached and locked in rotation to or detachably from the shaft. The chain wheel is secured in its installed position on the shaft by ring parts disposed on both sides of the chain wheel, and at least one of these ring parts has a divided locking ring which can be taken off radially from the shaft in order to take off the divided chain wheel from the shaft.

44 Claims, 8 Drawing Sheets

CHAIN DRUM ARRANGEMENT FOR SCRAPER CHAIN CONVEYORS

FIELD OF THE INVENTION

This invention relates to a chain drum arrangement for central or double central scraper chain conveyors.

BACKGROUND OF THE INVENTION

Prior German Patent Application 196 19 821.6 relates to a chain drum of the general type with which the present invention is concerned. A rotationally locked attachment of a divided chain wheel to a drive shaft mounted in a machine frame of the scraper chain conveyor is effected in this chain drum in the usual manner by means of a splined portion, whilst locking rings formed from divided sleeves or ring parts are attached, locked in rotation, to the shaft via tongue and groove joints. Since the planes of separation of the locking rings, which are each formed from two half rings, are disposed displaced in the circumferential direction of the chain drum shaft in relation to the plane of separation of the chain wheel, which consists of shell-type chain wheel segments, a design of the chain drum is possible in which the chain wheel segments are held together by the positive engagement around them of the locking rings, and screwed connections on the locking rings are relieved from the high operating forces so that no breakage of the screwed connections can occur in operation. The locking rings form drum bushings of relatively large width dimensions with the chain wheel.

SUMMARY OF THE INVENTION

Starting from the chain drum of the aforementioned type, the underlying object of the present invention is principally to fashion this arrangement for scraper chain conveyors comprising a chain drum arrangement which is provided with a single or double central chain belt in a manner such that, whilst the chain wheel, which is subjected to considerable wear during a conveying operation, can be installed and dismantled easily, the splined portions on the shaft and on the chain wheel, which are relatively expensive to manufacture, can be dispensed with in favour of a rotationally locked connection, which is relatively simple to manufacture, between the chain wheel and the shaft.

The invention provides an arrangement in which the chain wheel segments of the divided chain wheel are attached locked in rotation to the shaft via an axial feather key connection and can be taken off radially from the shaft disengaging from the feather key when the divided locking ring or locking rings are removed from the composite system. In this respect, the two shell-type chain wheel segments of the divided chain wheel are preferably each detachably attached, locked in rotation, to the chain drum shaft via an axial feather key connection.

In the chain drum arrangement according to the invention, the divided chain wheel is therefore attached locked in rotation to the shaft via a simple, inexpensive to manufacture, and sturdy feather key connection for the transmission of the drive torque between the shaft and the chain wheel, in such a way that after detaching and removing at least one divided locking ring the shell-type chain wheel segment can be removed radially from the engagement of the feather key connection and can be taken off the shaft. This results in simple installation and dismantling of the divided chain wheel, which is subjected to considerable wear during a conveying operation. Divided locking rings which rotate with the chain wheel are preferably disposed on both sides of the chain wheel, which is disposed on the shaft and is attached thereto via the feather key connection. However, it is also possible for a divided locking ring which can be detached from the shaft to be disposed on one of the two sides of the chain wheel only. With this arrangement, a non-divided locking ring, i.e. a one-piece locking ring, which advantageously also rotates with the chain wheel during a conveying operation, can be disposed on the other side of the chain wheel. The arrangement can be designed at the same time so that the locking ring or locking rings is or are detachably coupled to the chain wheel for rotational entrainment. The divided locking ring or each locking ring preferably consists of half rings which are detachably joined by a screwed connection comprising screws disposed approximately parallel to the tangential direction of the shaft. The locking rings which are disposed on the shaft on both sides of the chain wheel, at least one of which locking rings is designed as a divided locking ring, advantageously comprise annular retaining collars with which they fit round lateral shoulders of the divided chain wheel. The locking rings preferred ensure the displacement-free seating of the divided chain wheel on the shaft and may optionally also serve to secure the engagement of the feather key between the chain wheel and the shaft, although detachable retaining rings, which clamp round the chain wheel segments at annular shoulder faces or the like, are preferably provided for this purpose. It is also recommended that the plane of separation of the divided locking ring or locking rings be displaced circumferentially in relation to the plane of separation of the divided chain wheel, whereby the screwed connection of the divided locking ring or locking rings may be relieved from operational stresses which are excessively high.

According to a further advantageous design feature of the invention, side cheeks of the machine frame are each provided with a fixed hollow journal which projects axially into the interior space thereof, wherein the shaft is mounted with its shaft bearings in the hollow journals and the divided locking ring or locking rings is or are disposed as an intermediate ring between the respective hollow journal and the chain wheel. This arrangement makes it possible for the width of the locking ring or locking rings to be dimensioned so that they are relatively narrow. This is mainly advantageous as regards ease of insertion and removal of the divided locking ring into or from the composite chain drum system.

According to another preferred design feature of the invention, gap ring seals are disposed on the inside of the locking rings. These gap ring seals seal the gaps between the locking ring and the chain drum, and the sliding ring seals which are customary for chain drums are preferably used for them, wherein one of the sliding ring supports of the respective sliding ring seal is advantageously detachably disposed on the locking ring itself. The arrangement is preferably effected here so that the sliding ring support, which rotates with the chain wheel, of the sliding ring seal is detachably attached, locked in rotation, to the rotating locking ring, whilst the fixed sliding ring support is disposed on the aforementioned hollow journal which receives the shaft bearing.

On a divided chain wheel for a double central scraper chain conveyor in particular, the width of the divided locking ring or locking rings can be designed so that it is less than that of the chain wheel. The chain wheel here advantageously consists of two chain star wheel parts which are disposed side by side on the shaft and each of which is formed from two shell-type chain wheel segments. The two chain star wheels, each of which is divided, can thereby each be taken off the shaft, or placed on the shaft for installation, when the locking ring or locking rings are removed. Moreover, the two chain star wheel parts of the chain wheel are advisedly attached to the shaft via the feather key connection so that their planes of separation are displaced in relation to each other by 60° to 70° in the circumferential direction of the shaft, whereby an advantageous transmission of the drive torque from the shaft to the chain wheel and thus to the scraper chain belt may be achieved.

On a divided chain wheel, the plane of separation between the shell-type chain wheel segments is advisedly placed so that it runs out at each of its two ends into a tooth gap of the chain wheel. If the chain wheel or each chain star wheel part of the same has an odd number of teeth, the plane of separation of the chain wheel or of the chain star wheel part is a kinked plane of separation, the two limbs of which are inclined in relation to each other at an obtuse angle, wherein the two shell-type chain wheel segments each have a different arc length and a different number of teeth.

Further preferred design features of the invention are given in the claims and also follow from the description given below of the example of embodiments which are shown in the drawings.

DETAILED DESCRIPTION OF THE EMBODIMENTS

Figure 1:
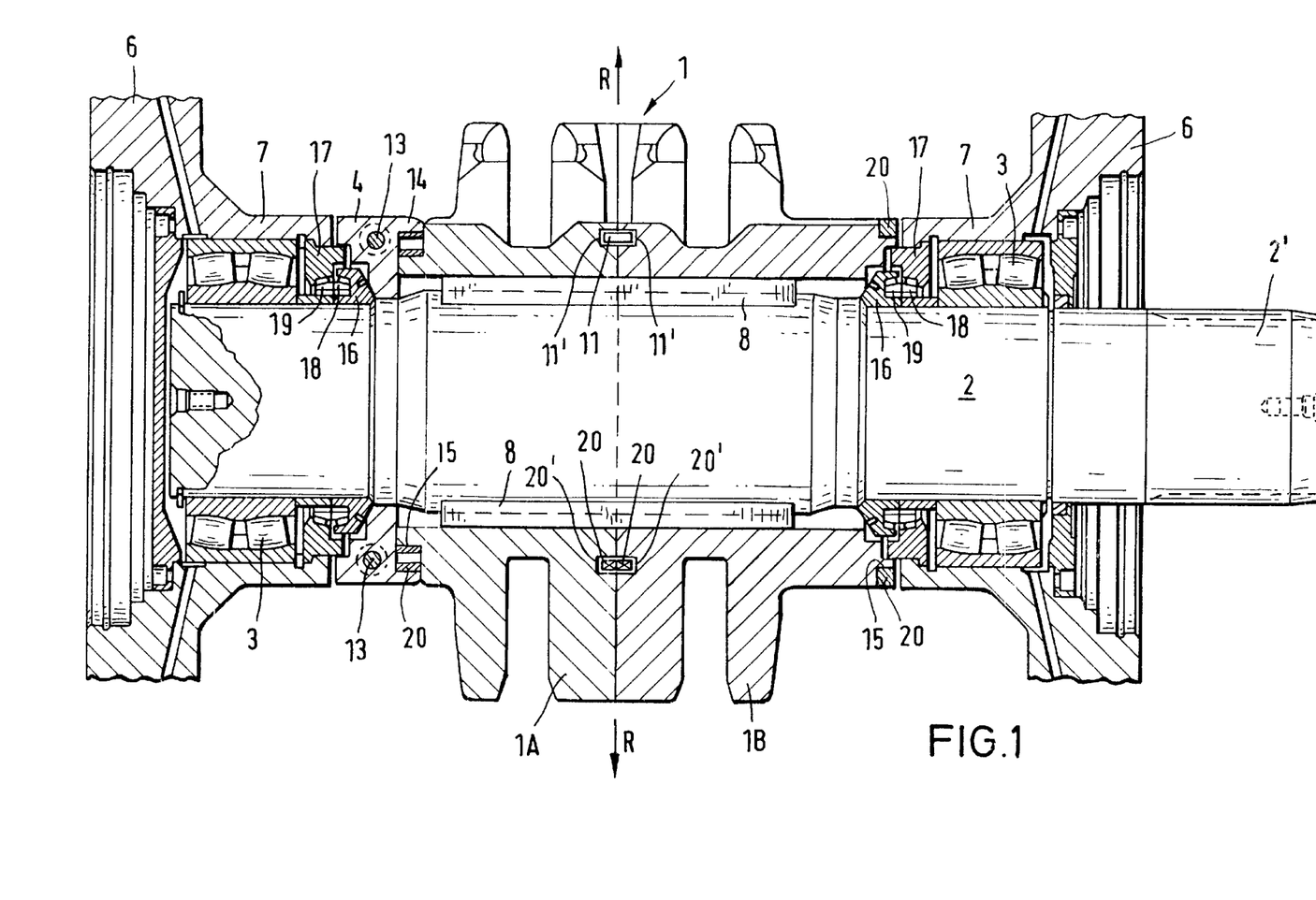
FIG. 1 is a section through an embodiment of a chain drum arrangement according to the invention, also showing parts of the machine frame which serves for mounting the chain drum.
Figure 2:
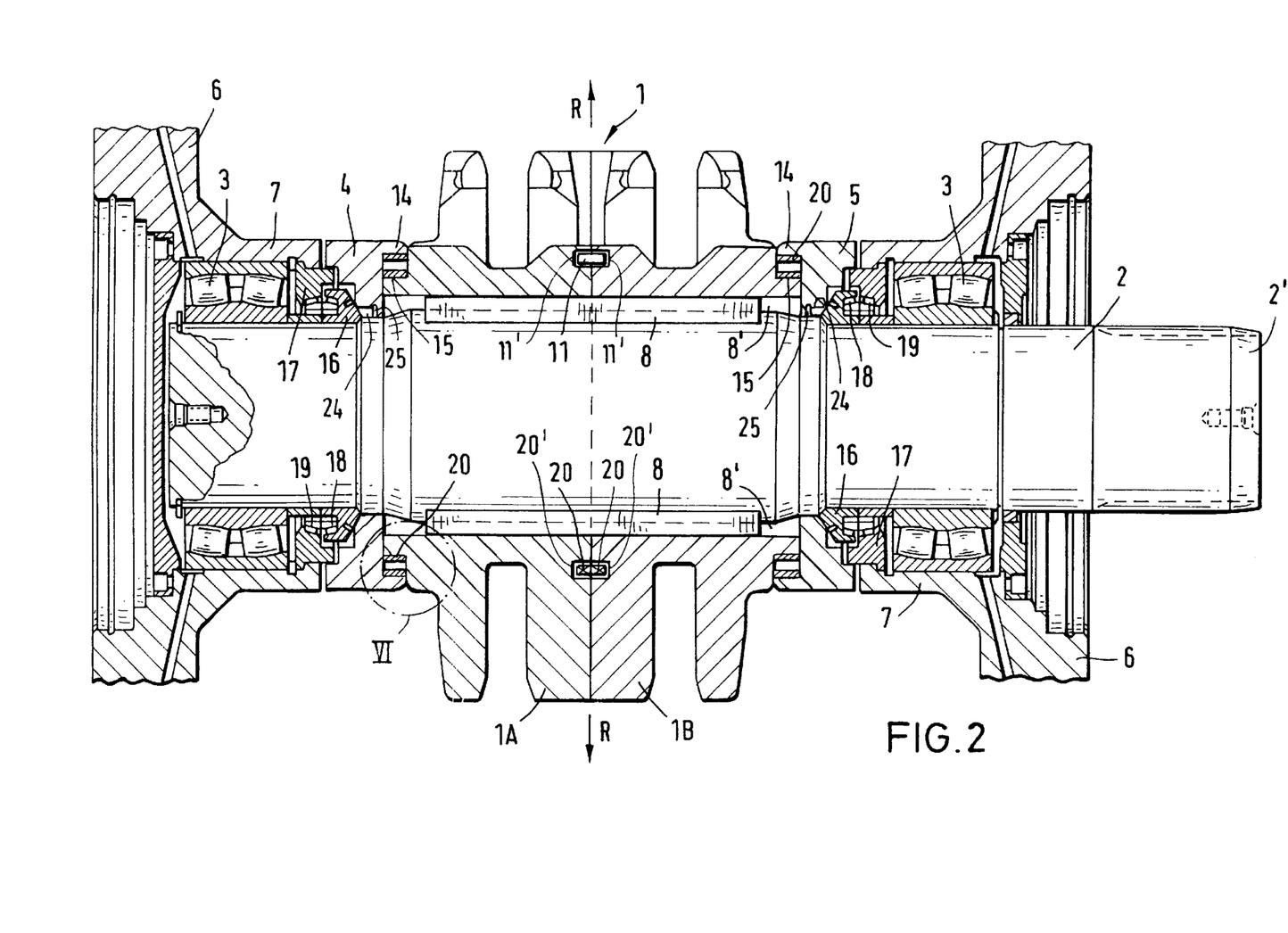
FIG. 2 shows a modified chain drum arrangement according to another embodiment of the invention, as a sectional illustration corresponding to that of FIG. 1.

The main parts of the chain drum arrangements for central or double central scraper chain conveyors which are shown in FIGS. 1 and 2 consist of a divided chain wheel 1, a horizontal shaft 2 which carries this chain wheel and which is mounted on both sides of the chain wheel 1 in shaft bearings 3 consisting of rolling bearings, a divided locking ring 4 in the embodiment shown in FIG. 1 and two locking rings 4 and 5 in the embodiment shown in FIG. 2. In FIGS. 1 and 2, the two vertical side cheeks 6 of the machine frame of the scraper chain conveyor which receives the chain drum are merely shown in the region of the shaft mounting and of the cheek apertures which are disposed on them. A hollow journal 7, which projects axially into the interior space of the machine frame, is fixedly disposed on each of the side cheeks 6, and receives the respective shaft bearing 3 of the shaft 2; the shaft end 2' on the driving side is led out of the machine frame at the side.

Figure 3:
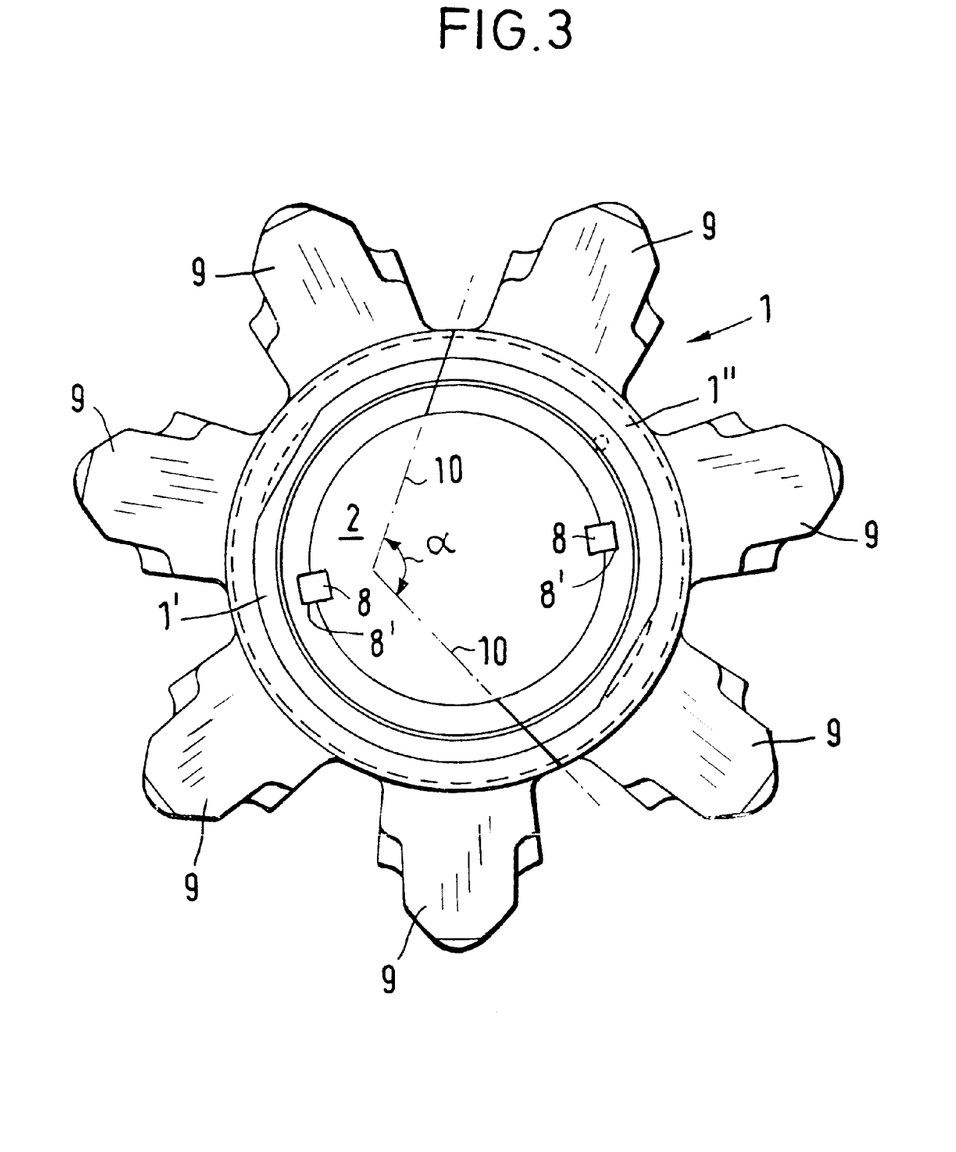
FIG. 3 is a side view of the divided chain wheel, showing its plane of separation, which is provided in the chain drum arrangement shown in FIGS. 1 and 2.

In FIGS. 1 and 2, the chain wheel 1 is constructed as a double chain wheel for a double central scraper chain conveyor, and accordingly comprises two separate chain wheel parts or chain star wheels 1A and 1B, which may be of identical construction to each other and which each consist of two shell-type chain wheel segments 1' and 1", as can be seen from FIG. 3. Each chain star wheel part 1A and 1B is therefore of divided construction, and in the embodiment shown has an odd number of teeth, namely seven teeth 9 here. The plane of separation of the chain wheel or of each of its two chain star wheel parts 1A and 1B is denoted in FIG. 3 by 10, and runs in each case within a tooth gap between two adjacent teeth 9 of the respective chain star wheel part 1A or 1B. Consequently, each chain star wheel part 1A and 1B consists of two shell-type chain wheel segments 1' and 1" of different arc lengths and with different numbers of teeth. In the embodiment illustrated, chain wheel segment 1' has the greater arc length and is provided with four teeth 9 which are disposed distributed over the arc length, whilst the other chain wheel segment 1" with the smaller arc length carries three teeth 9. The different arc lengths of the chain wheel segments 1' and 1" result, at each chain star wheel part 1A and 1B, in a kinked butt joint or plane of separation between the two chain wheel segments 1' and 1". When produced towards the centre of the chain star wheel part, it can be seen that the two limbs of this plane of separation 10 are inclined in relation to each other at an angle a which is preferably about 110° to 120°. In the central region between the two side cheeks 6 of the machine frame, the two chain star wheel parts 1A and 1B are detachably attached, locked in rotation, to the drive shaft 2 via a feather key connection 8, wherein each chain star wheel part 1' and 2' is attached by means of a feather key connection 8 to the shaft 2 so that the latter transmits torque in its direction of rotation. As shown in FIGS. 1 and 2, the feather key connection 8 extends over the central region of the shaft 2, the diameter of which is reduced on both sides of this central region. In their installed state, the two chain star wheel parts 1A and 1B are situated with their mutually facing side faces seated against each other.

The two chain star wheel parts 1A and 1B are installed on the shaft 2 via the feather key connections 8 so that their kinked planes of separation are displaced in relation to each other in the circumferential direction of the shaft 2, advantageously at an angle of 60° to 70°. This angularly displaced installed position of the two chain star wheel parts 1A and 1B which form the chain wheel 1 results in an improvement in the transmission of torque from the shaft 2 via the chain wheel 1 to the two scraper chains during a conveying operation. The feather key connections may consist of sturdy feather keys which are fixedly disposed on the shaft 2 and which engage locked in rotation in corresponding axial slots 8' on the inner cylindrical hub faces of the chain star wheel parts 1A and 1B or of the chain wheel segments 1' and 2' thereof. Instead of this, however, the feather key strips of the feather key connections 8 may also be fixedly disposed on the inner hub faces of the chain star wheel parts and may engage in corresponding slots in the shaft 2. It can be seen from FIGS. 1 and 2 that the axial length of the feather key connections 8 is somewhat less than the width of the chain wheel 1 which is constructed as a double chain wheel. The two chain star wheel parts 1A and 1B can be joined by pegging or pinning them axially at their mutually facing side faces which are in surface contact with each other, and can be positioned at the aforementioned angular displacement in relation to each other in their installed position. FIGS. 1 and 2 show a dowel pin or alignment pin 11 such as this, which engages in blind holes 11' on the side faces of the chain star wheel parts 1A and 1B and thus detachably positions the two chain star wheel parts in relation to each other in the direction of rotation.

Figures 4, 5:
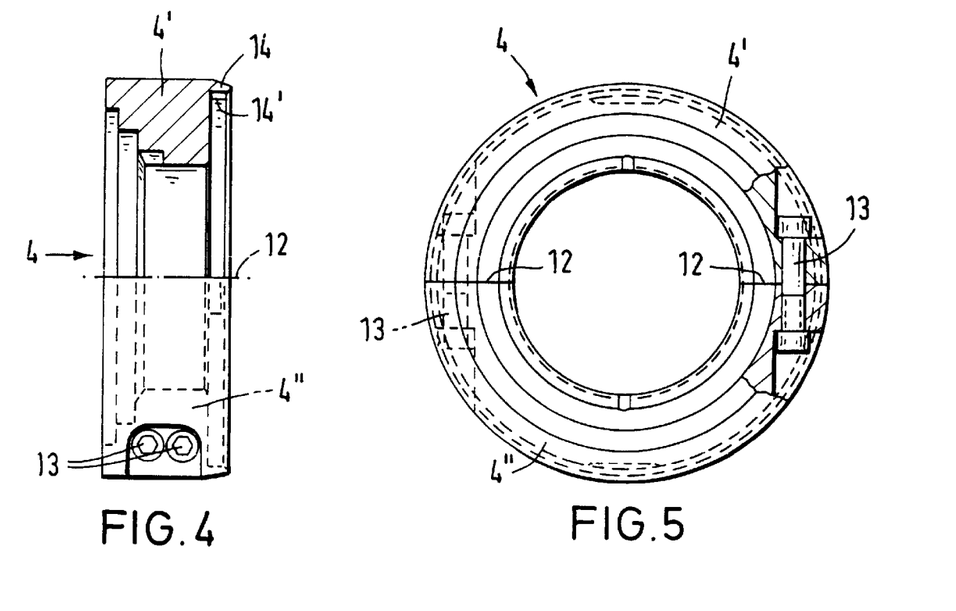
FIG. 4 is a side view, shown partly as a radial section, of an individual locking ring of the chain drum arrangement shown in FIGS. 1 and 2.
FIG. 5 is a front view of the locking ring shown in FIG. 4.

The divided locking ring 4 shown in FIGS. 1 and 2 is disposed as an intermediate ring between the respective hollow journal 7 and the installed chain wheel 1. As can be seen in particular from FIGS. 4 and 5, the divided locking ring 4 consists of two half ring parts or ring segments 4' and 4", which are detachably joined to each other at their radial planes of separation 12 by means of screws 13 to form the closed locking ring, wherein the screws 13 pass through approximately tangential holes in the locking ring segments 4' and 4". As shown in FIG. 4, the two locking ring segments 4' and 4" can be joined at each plane of separation 12 by two parallel screws 13 which are disposed parallel to the tangential direction of the shaft 2. Moreover, FIGS. 1, 2 and 4 show that the locking ring 4 has a flange or annular retaining collar 14 on its external circumference, which collar is aligned axially towards the chain wheel and which in its installed state surrounds an annular lateral shoulder 15 on the respective side face of the divided chain wheel 1 or of the chain star wheel part thereof.

Figure 6:
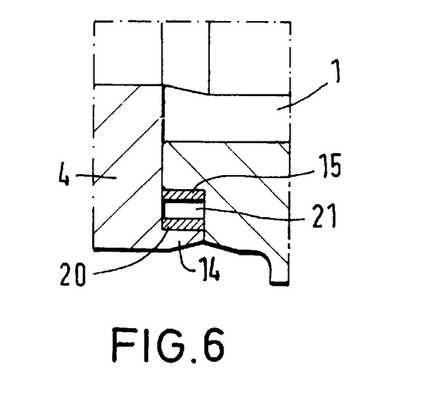
FIG. 6 shows the detail denoted by circular area VI in FIG. 2, on an enlarged scale.

In the chain drum arrangement shown in FIG. 1, a locking ring 4 of the aforementioned type is disposed as an intermediate ring between the chain wheel 1 and the hollow journal 7 on one side only (the left side) of the divided chain wheel 1, whilst on the opposite side the divided chain wheel 1 terminates with a gap spacing in relation to the inner, annular end face of the hollow journal 7 which is situated there. The chain drum has gap ring seals, which close the gap between the locking ring 4 and the hollow journal 7 which is situated there or between the chain drum and the adjacent hollow journal 7, and which consist of sliding ring seals. The sliding ring seals each have two annular sliding ring supports 16 and 17, which are fitted with metal sliding rings 18 and 19, respectively, which are in sealing contact with each other. On the side of the divided locking ring 4, the sliding ring support 16 is seated in an internal turned hollow in the locking ring 4 or in its two ring segments 4' and 4", which hollow comprises a plurality of steps in its diameter, whilst the other sliding ring support 17 is disposed in the end of the hollow journal 7. The sliding ring support 16 associated with the locking ring 4 is advisedly attached locked in rotation but detachably to the locking ring 4 or to its two segments 4' and 4", so that it is entrained by the locking ring 4, which rotates with the chain wheel 1. On the opposite side, on which no divided locking ring 4 is provided according to FIG. 1, the outer sliding ring support 17 is likewise situated at the end of the internal opening of the hollow journal 7, whilst the inner sliding ring support 16 is disposed in a turned hollow on the hub of the divided chain wheel 1, and is attached, locked in rotation but detachably, either to the shaft 2 or to the chain wheel for rotational entrainment. On the side of the divided locking ring 4, the two chain wheel segments 1' and 1" of the chain star wheel part 1A are held together via a detachable retaining ring 20 which clamps round the annular lateral shoulder 15 and which is surrounded by the annular retaining collar 14 of the locking ring 4. This situation is shown on an enlarged scale in FIG. 6. It can be seen from FIG. 6, and from FIG. 7 also, that the retaining ring 20 may comprise a plurality of tapped holes 21 distributed over the circumference of its ring, into which a pulling-off screw can be screwed after removing the locking ring 4, from the free space which is thereby created. With this pulling-off screw, the retaining ring 20 can be pulled off from the lateral shoulder towards the adjacent hollow journal 7. Instead of this, or in addition thereto, a plurality of recesses 22 may be disposed on the retaining ring 20 over the circumference thereof, into which a hand tool can be introduced in order to pull off the retaining ring from the lateral shoulder 15.

Figure 7:
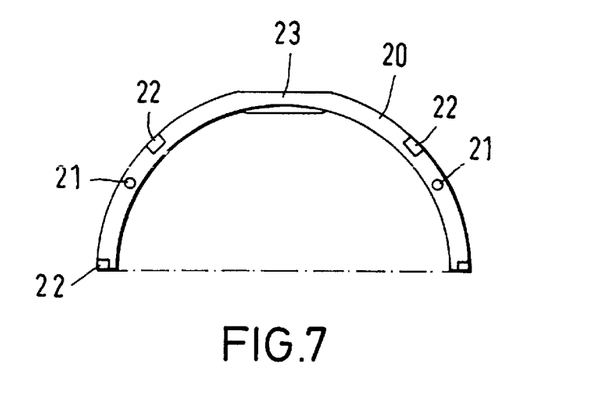
FIG. 7 is a partial view of an individual retaining ring.

The divided locking ring 4 is detachably coupled, locked in rotation, to the chain wheel 1 or to its chain star wheel part 1A. As shown in FIG. 7, this can be effected by providing the retaining ring 20 at its annular external contour with at least one flattened portion 23, against which a correspondingly flattened cam-like formation 14' (FIG. 4) on the annular inner face of the retaining collar 14 of the locking ring 4 is seated, so that in its installed state this cam-shaped formation is entrained by the chain wheel 1 which is driven via the shaft 2. Instead of this, however, the rotational entrainment of the locking ring 4 can be effected in other manners, e.g. by a rotationally locked connection with the shaft or with the divided chain wheel.

In the embodiment shown in FIG. 1, the two shell-type chain wheel segments 1' and 1" of the other chain star wheel part 1B are likewise held together via a retaining ring 20 of the aforementioned type which clamps round these chain star wheel segments at an annular shoulder 15, which is disposed at the end of the chain wheel 1 or of its chain star wheel part 1B which is situated here. FIG. 1 also shows that other retaining rings 20 can be disposed between the two chain star wheel parts 1A and 1B, which for this purpose each have an encircling annular groove 20' on their mutually facing side faces for receiving a detachable retaining ring 20. In total, four retaining rings 20 which clamp round the chain wheel segments are provided here, as on the divided chain wheel 1. These retaining rings can be removed from their seatings on the chain star wheel parts 1A and 1B when the chain wheel is installed, and in their installed state they secure the chain wheel segments in feather key engagement with the shaft 2.

In order to remove the divided chain wheel 1 from the chain drum arrangement shown in FIG. 1 and to replace it by a new chain wheel if need be, the screws 13 of the locking ring 4 are removed and the two locking ring segments 4' and 4" which are separated from each other are taken off radially from the shaft 2. The retaining ring 20 situated on the side of the locking ring 4 is then pulled off laterally by means of a tool, as described above, from the lateral shoulder 15 of the chain drum 1 towards the hollow journal 7 which is situated here, whereupon the chain star wheel part 1A is displaced to the left on the shaft 2 from the other chain star wheel part 1B, with the connection 11 being detached, so that the retaining rings 20 situated between the chain star wheel parts 1A and 1B can now be detached, as can the retaining ring 20 situated on the right side, and the chain wheel segments 1' and 1" of the divided chain wheel 1 or of its two chain star wheel parts 1A and 1B can be lifted in the radial direction R out of the feather key engagement and removed from the shaft 2. The installation of the divided chain wheel 1 on the shaft 2 is correspondingly effected in the reverse order. In this respect, it should be remarked that when the chain wheel 1 is removed the retaining rings 20 can remain on the haft 2 so that they are subsequently available for clamping the chain wheel segments when a new chain wheel is installed.

For the chain drum arrangement shown in FIG. 1, it is recommended that the hollow journal 7 on the side where there is no divided locking ring 4 be provided with an annular retaining collar which corresponds to the retaining collar 14 and which in its installed state fits round the chain wheel or its chain star wheel part 1B. Moreover, in its installed state the chain wheel is secured against axial displacement on the shaft 2 on one side by the divided locking ring 4 which is situated in the installed position shown, and on the opposite side by the hollow journal 7.

In the preferred embodiment of the chain drum arrangement which is shown in FIG. 2, locking rings 4 and 5 are disposed on both sides of the divided chain wheel 1 and of the longitudinal section of the shaft 2 which comprises the feather key connection 8. In this embodiment, the locking ring 5 can likewise be designed as a divided locking ring corresponding to the locking ring 4 described above. Instead of this, however, the locking ring 5 can be constructed as a non-divided, one-piece locking ring, the annular retaining collar 14 of which surrounds the annular lateral shoulder 15 of the chain star wheel part 1B. In its installed state, the divided chain wheel 1, which is constructed as a double chain wheel, is therefore secured against axial displacement on the shaft 2 by the two locking rings 4 and 5 here. Moreover, the two chain star wheel parts 1A and 1B are also positioned in relation to each other as regards their rotational displacement here via an alignment pin 11 and are secured in feather key engagement 8 by four retaining rings 20. In this respect the arrangement corresponds to that of FIG. 1, and it is only the retaining ring 20 which is situated on the side of the locking ring 5 which is surrounded by the retaining collar 14 thereof. As described above in connection with FIGS. 4 to 7, the retaining rings situated on the faces of the locking rings are attached to the divided chain wheel for rotational entrainment. The installation and removal of the divided chain wheel 1 shown in FIG. 2 are correspondingly effected in the same manner as for the embodiment shown in FIG. 1.

If the locking ring 5 of the chain drum arrangement shown in FIG. 2 is also designed as a divided locking ring corresponding to the locking ring 4, both locking rings 4 and 5 can be removed by removing their screws 13 in order to remove the divided chain wheel 1, whereupon the divided chain wheel can be taken off in the radial direction R from the shaft 2 after removing the retaining rings 20.

Whereas in the examples of embodiments which were described above and which are shown in FIGS. 1 and 2 the chain wheel 1 consists of a double chain wheel which comprises two divided chain star wheel parts 1A and 1B in each case and is accordingly intended for use in a double central scraper chain conveyor, the chain wheel 1 can also be designed, however, for a central scraper chain conveyor which comprises only a single chain belt which circulates centrally in the conveying pan. In this case, the chain wheel 1 only has a single chain star wheel part, which is formed in the manner described from two shell-type chain wheel segments 1' and 1". These chain wheel segments are attached locked in rotation to the shaft 2 in the same manner via feather key connections and are secured on the shaft by means of the locking ring or locking rings, wherein the two chain wheel segments 1' and 1" can be held together by two retaining rings 20 disposed on the lateral shoulders 15 on their locking ring faces. Moreover, the arrangement is advantageously designed so that the plane of separation of the divided locking ring or locking rings is displaced in the circumferential direction of the shaft in relation to that of the divided chain wheel. As indicated in FIG. 2, the rotating sliding ring supports 16 can be provided with axial pegs or inserted axial alignment pins 24 which engage in corresponding recesses 25 on the internal circumference of the locking ring 4 or 5, whereby these sliding ring supports are attached locked in rotation to the locking ring so that they are entrained by the locking ring, which rotates with the chain wheel 1. In this respect the recesses 25 may consist of grooves which are open towards the shaft 2, so that after detaching the screwed connection 13 the two ring segments 4' and 4" of the divided locking ring 4 can be pulled off the sliding ring support 16, which thus remains on the shaft 2.

Figure 8:
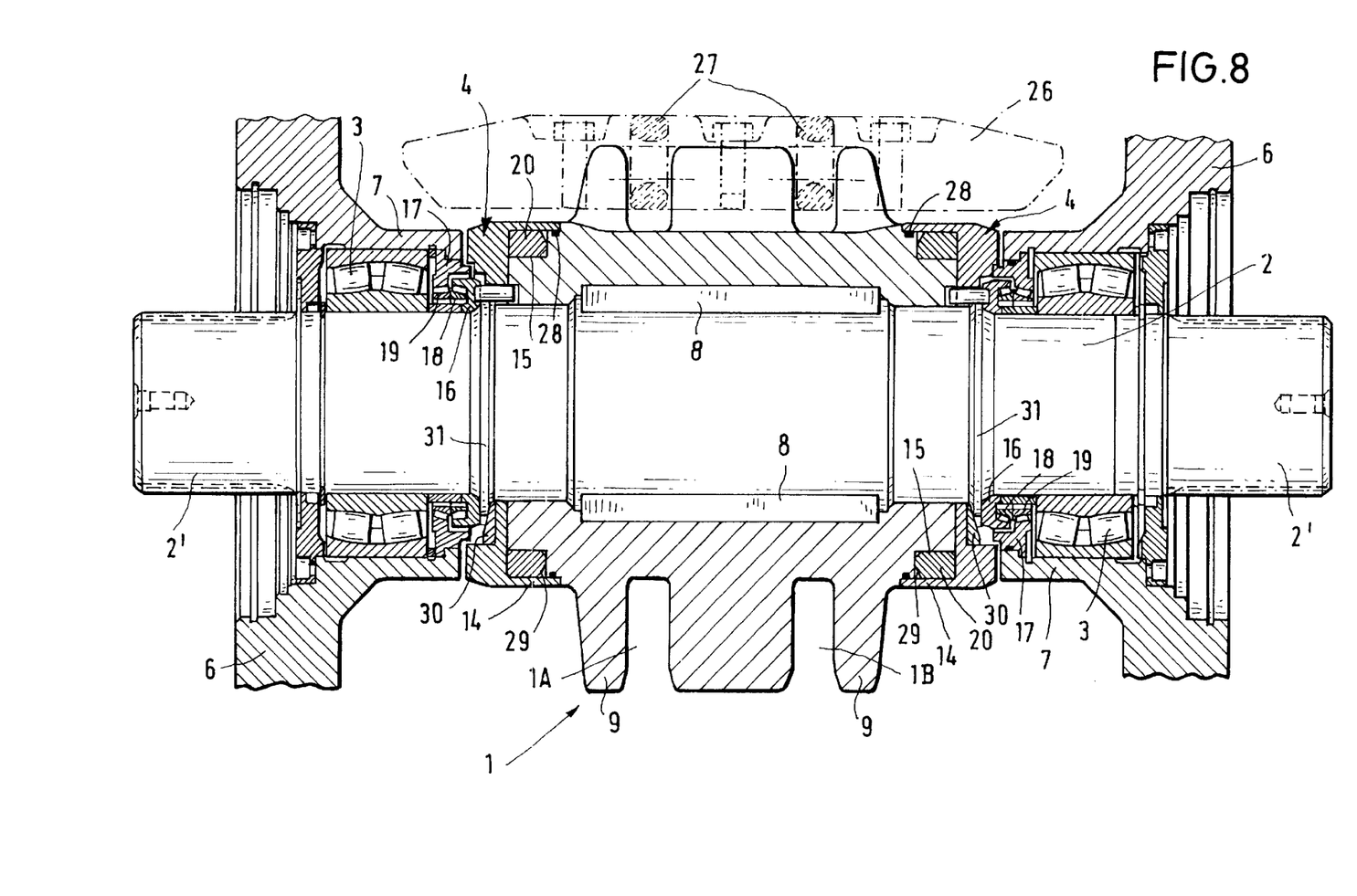
FIG. 8 is an axial section through a modified embodiment of a chain drum arrangement according to the invention.

FIG. 8 is a sectional illustration, corresponding to that of FIGS. 1 and 2, of another advantageous embodiment of a chain drum arrangement according to the invention in the machine frame of a scraper chain conveyor, wherein components which are the same or which have equivalent functions are denoted by the same reference numerals. The embodiment of the chain drum arrangement which is illustrated in FIG. 8 is intended for a double central scraper chain conveyor, the two endless chain belts 27 of which, which are parallel to each other and which carry the scrapers 26, are indicated in FIG. 8. The chain wheel 1 consists here of a divided double chain wheel, the two shell-type chain wheel segments 1' and 1" of which are each provided with two chain star wheel segments or chain star wheel parts 1A and 1B which are fixedly disposed on them, preferably in one piece. The two chain wheel segments, which in their joined state form the chain drum, may be divided in the manner shown in FIG. 3 for the single chain wheel, with the angled plane of separation 10 of the chain wheel segments 1' and 1". Instead of this, the two chain wheel segments 1' and 1" in the chain drum arrangement shown in FIG. 8 may consist of half shells which carry the chain star wheel parts and which are assembled along a diametral plane to form the cylindrical chain drum. However, in the chain drum arrangement shown in FIG. 8, the two chain wheel segments may also be provided with a single chain star wheel only, in the event that the chain drum arrangement is used in a central chain scraper conveyor which only has s single scraper chain belt 27.

Figures 13, 14:
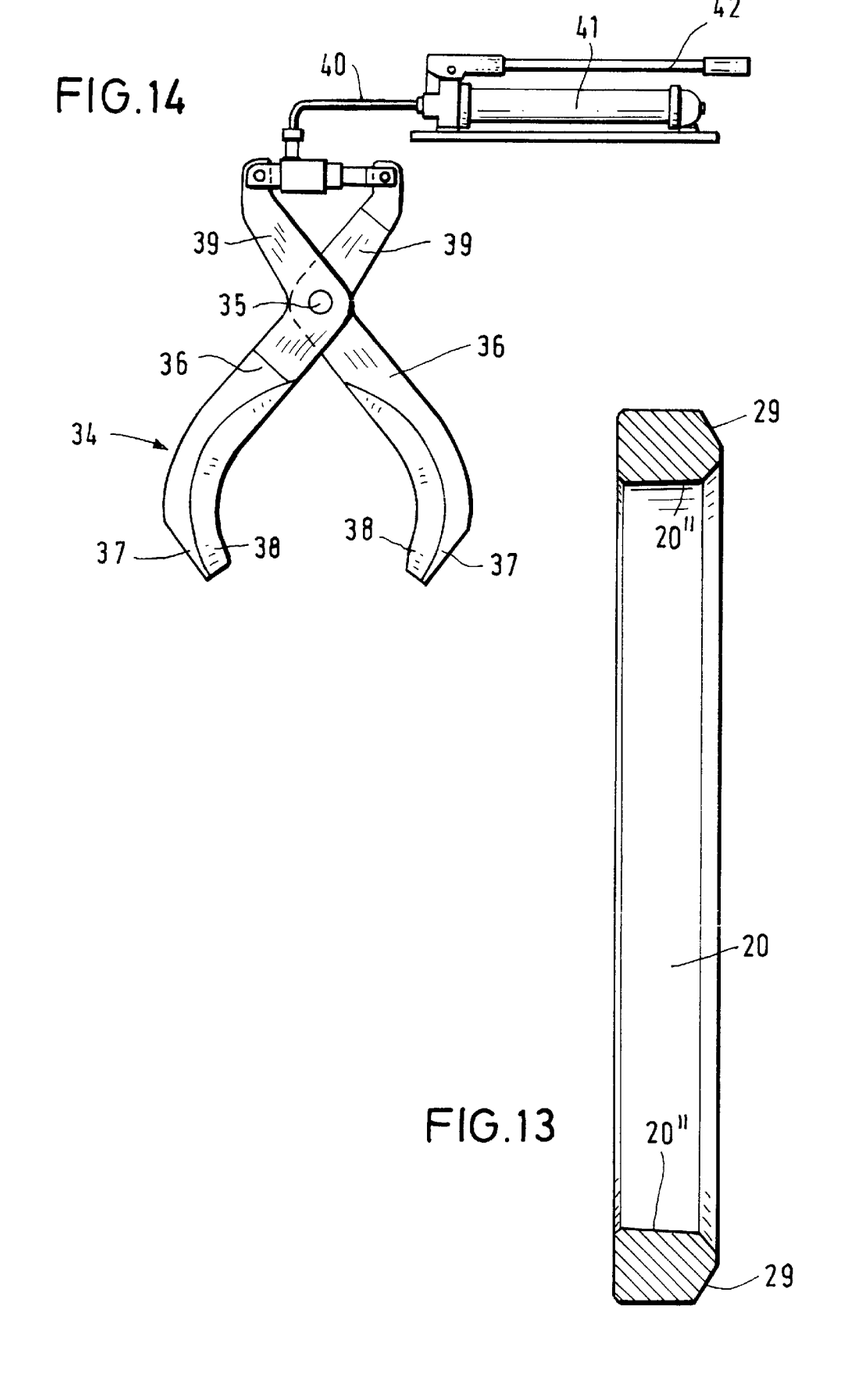
FIG. 13 is a diametric section through one of the retaining rings provided in the chain drum arrangement shown in FIGS. 8 to 12.
FIG. 14 is a view of a scissors-like dismantling tool for dismantling the retaining rings from the chain drum arrangement according to embodiments of the invention.

In the arrangement shown in FIG. 8, the two ends 2' of chain drum shaft 2, which is mounted in the shaft bearings 3, are led laterally out of the openings in the side cheeks 6 of the machine frame of the scraper chain conveyor, so that a dual drive for the shaft 2 and for the chain drum disposed thereon can be provided here. Moreover, the construction of the chain drum arrangement is designed so that it is symmetrical about the vertical mid-plane, with the use of two divided locking rings 4, which are of identical constructions to each other, and the retaining collars 14 of which, which are constructed in the manner of annular flanges, fit round the annular lateral shoulders 15 and the retaining rings 20 which rest thereon under a stress, wherein the flange-like retaining collars 14 fit round the chain wheel segments in the peripheral end regions thereof and with a seal 28 interposed therebetween which is disposed in a groove in the chain wheel segment, which chain wheel segments are disposed on the shaft 2, by means of the feather key connections 8, so that they are locked in rotation but are radially detachable. AS shown in FIG. 8, the lateral shoulders 15 which are encompassed by the outer retaining rings 20 are of tapered construction, in a manner such that, from their ends situated on the side of the locking ring 4, and in the axial direction of the chain drum and shaft axis, they ascend at a slight taper angle of 2–4° and accordingly form a retaining ring supporting and wedging face. As shown in FIG. 13, the one-piece retaining ring 20 is provided with an annular inner face 20" with ascents at a corresponding taper, and which ascends here at a taper angle of 3° from one side of the retaining ring to the other. Sliding the two one-piece retaining rings 20 on to the tapered lateral shoulders 15 of the axially divided chain drum which are associated therewith thus results in the two shell-type chain wheel or chain drum segments being wedged and fixedly braced, with the securement of their feather key engagement on the shaft. Moreover, it can be seen from FIG. 13 in the particular that the two retaining rings 20 of identical construction are each provided with an wedge chamfer 29 which is disposed in their outer peripheral region and which encircles them in the form of an annulus. The chamfer, for example, is inclined at an angle of 30° to the diametric direction of the retaining ring, and forms an application face for a dismantling tool which is described in more detail below, by means of which the retaining rings 20, which are seated braced by wedging on the lateral shoulders 15, can be pushed from the lateral shoulders towards and on to the adjacent hollow journals 7.

Figure 10:
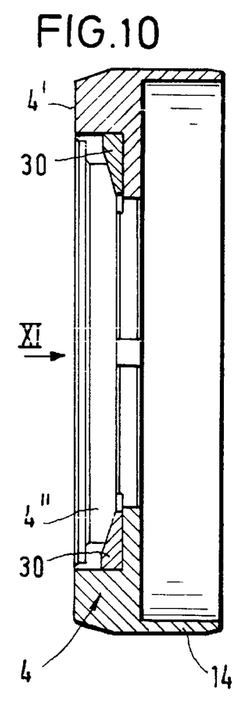
FIG. 10 is a diametric section through one of the two divided locking rings of the chain drum arrangement shown in FIG. 8.
Figure 11:
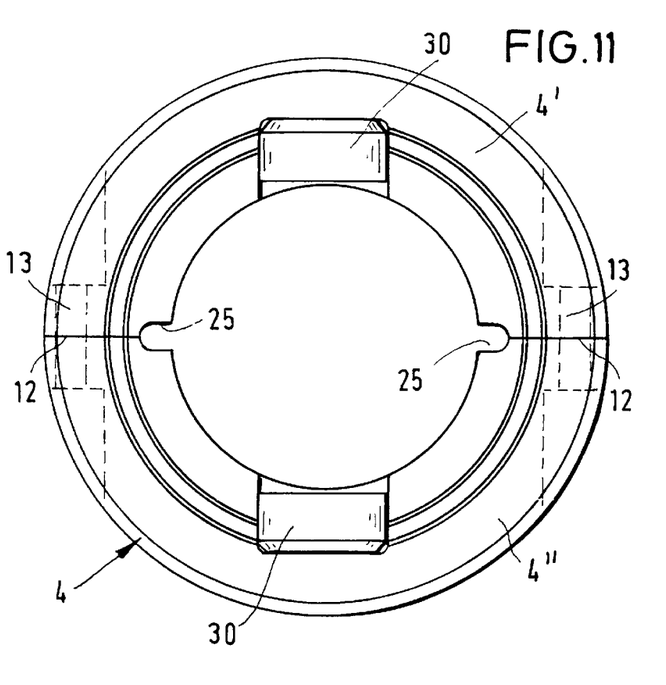
FIG. 11 is a view of the locking ring of FIG. 10 in the direction of arrow XI of FIG. 10.

The locking rings 4 which are used in the chain drum arrangement of FIG. 8 are shown in FIGS. 10 and 11. The locking rings 4, which consist of the half ring 4' and 4" which can be screwed together, comprise the aforementioned recesses 25, which are situated in the plane of separation 12 of the ring segments 4' and 4", for the engagement of the pegs or dowel pins 24 which serve for the rotational entrainment of the sliding ring supports 16 during a conveying operation. These recesses 25 are open towards the inside of the divided locking ring. It can also be seen that the locking rings 4 are each provided on their outer face facing the adjacent shaft bearing 3 with radially outwardly ascending wedge contact faces 30, which may consist, for example, of wedge parts which are fixed by adhesive bonding and which in the embodiment illustrated are disposed in the centre of the arc of the two ring segments 4' and 4" which can be screwed together. It can be seen from FIG. 8 that the shaft 2 which passes through has a shaft flange or a said shaft collar 31 on each locking ring side, against which the edge contact faces 30 of the locking rings 4 are supported. This measure ensures that when the locking rings 4 are installed, i.e. when the screws 13 are tightened, the ring segments 4' and 4" are pressed against the respective end face of the chain drum by their wedged support on the shaft collars 31. Hereby the inner tapered faces 20" of the retaining rings 20 are pressed on to the tapered lateral shoulders 15 with wedging or fixed bracing, due to which the chain wheel segments are fixedly clamped all round by means of the retaining rings 20 and are secured in the position on the shaft 2.

Figure 9:
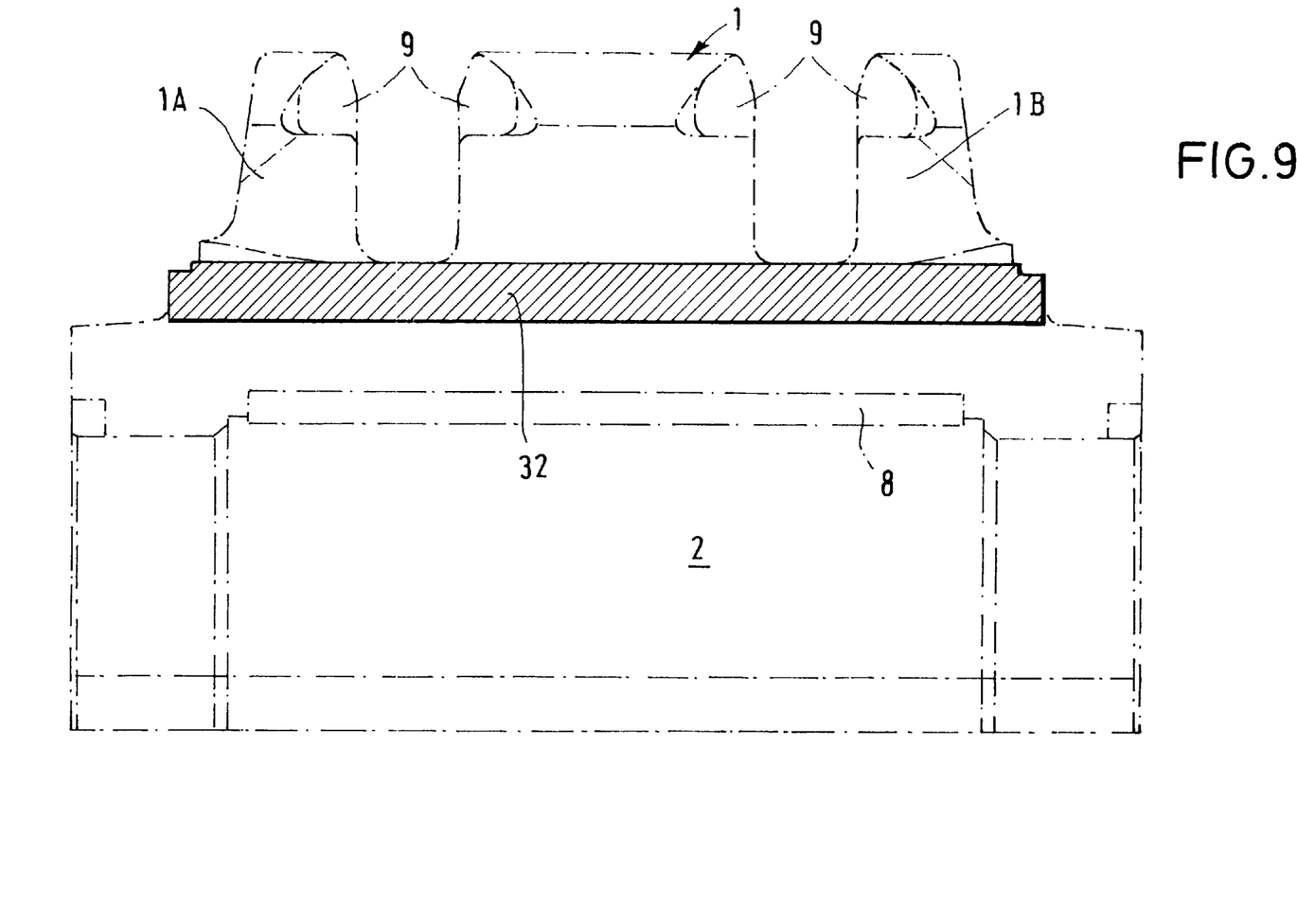
FIG. 9 is a simplified schematic illustration of a detail of the chain drum arrangement shown in FIG. 8, namely a flat seal disposed between the two chain wheel segments.
Figure 12:
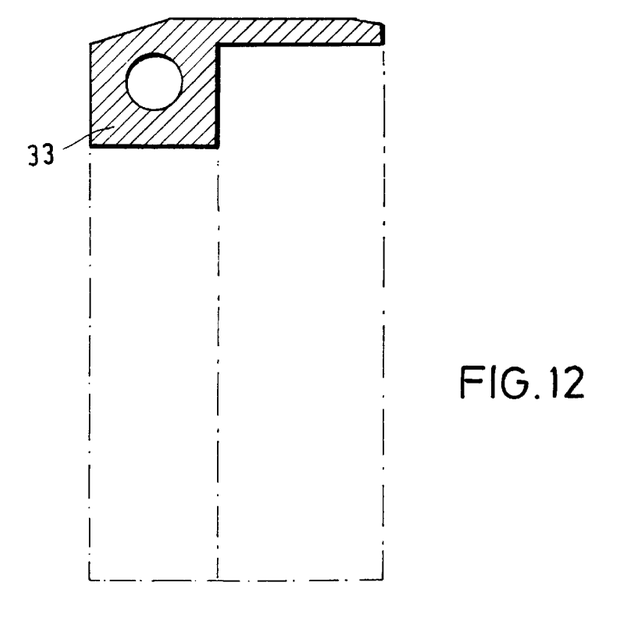
FIG. 12 is a view of a seal on the divided locking ring shown in FIGS. 10 and 11.

It is recommended that the two shell-type chain wheel segments are sealed at their plane of separation against the ingress of dirt and moisture. This is indicated in FIG. 9. As shown in this Figure, flat seals 32 are disposed on the two planes of separation at which the chain wheel segments 1' and 1" adjoin each other. The flat seals externally seal the parting line between the chain star wheel parts in their installed state here. These flat seals may consist of a suitable flexible rubber of plastics material or the like, and advisedly have a thickness of about 1 mm. The divided locking rings 4 can also be provided with flat seals on the planes of separation of their ring segments 4' and 4". A flat seal such as this is denoted by 33 in FIG. 12 and can be e.g. approximately L-shaped. It can be seen that the flat seal has a peripheral shape which corresponds to the cross-sectional shape of the locking ring 4 with the flange-like retaining collar 14. These flat seals 33 also advisedly consist of a plastics or rubber material with a thickness of about 1 mm. The flat seals 33 may also be attached, e.g. by adhesive bonding, to one of the two ring segments 4', 4". The same type of fixing can be employed for the flat seals 32 between the chain wheel segments of the chain drum.

In order to dismantle the chain drum shown in FIG. 8, the screwed connections 13 of the two locking rings 4 are removed, whereupon the ring segments 4' and 4" of the locking rings can be removed from the assembly radially in relation to the shaft axis. The retaining rings 20, which are seated braced by wedging on the lateral shoulders 14, are then pushed off laterally from the lateral shoulders. This can be effected by means of a tool which is placed on the retaining ring 20 or on the wedge chamfer 29 thereof. One advantageous embodiment of a hand tool such as this which can be used for rapid dismantling is shown in FIG. 14. The dismantling tool 34 which is shown here for detaching the retaining rings 20 when the chain drum is dismantled is constructed in the manner of a pair of tongs or scissors, the two scissors parts 36 of which, which are connected by a common joint 35 in the manner of two-armed levers, each having a working face 38 on the inside of their scissors jaws 37, which can swivel in relation to each other in the directions of opening and closing of the scissors, which working face is chamfered corresponding to the wedge chamfer 29 of the retaining ring 20 (FIG. 13). The working faces 38 here are therefore formed from wedge-shaped pressure faces on the inside of the scissors jaws 37, which can be placed against the wedge chafer 29 in order to push off the retaining rings from the lateral shoulders 15 of the chain wheel segments. It can also be seen from FIG. 14 that the powered lever arms 39 of the two scissors parts 36 are joined at their free ends via a small hydraulic swivelling cylinder 40, by means of which the dismantling scissors can be operated. In addition, the dismantling tool comprises a small hand pump 41 which can be operated by means of a hand lever 42 of the like in order to extend the swivelling cylinder 40 hydraulically in the direction of a closing movement of the scissors jaws 37. Together with the scissors, the hand pump forms a constructional unit which can be operated manually.

After removing the locking rings 4, the scissors-like dismantling tool 34 shown in FIG. 14 is paced, radially in relation to the axis of the shaft 2, against the retaining ring 20 which is wedged on the lateral shoulder 15 so that the working faces 38 of its two spread-apart scissors jaws 37 act on two diametrically opposed points on the retaining ring 20, on the wedge chamfer 29 thereof. The swivelling cylinder 40 is then operated by means of the hand pump, in the direction of a closing movement of the scissors or of its two scissors jaws 37, so that due to the closing movement the retaining ring 20 is pushed off, by the haw faces 38 acting on the wedge chamfer 29, from the lateral shoulder 15 to the said where the locking ring 4 was previously situated. After the retaining rings 20 have been removed, the two chain wheel segment of the chain drum can be taken out radially from the feather key engagement 8 and removed, as was explained above in detail in connection with the embodiments shown in FIGS. 1 and 2.

Considerable simplifications in manufacture can be achieved with the feather key connection described above of the divided chain wheel 1 to the shaft 2. At the same time, the invention creates the possibility of making the width of the locking ring or locking rings of reduced dimensions, which in the case of the divided locking ring also has the advantage of particularly simple manipulation of the same on installation and removal. It should be understood that the invention is not restricted to the examples of embodiments described above, but that these can be subjected to various kinds of modifications without departing from the scope of the invention. If need be, the use of the retaining rings can also be dispensed with if their function is already performed by the locking rings which fit round the divided chain wheel at the lateral shoulders thereof, or if securement of the feather key engagement is effected using other means. Moreover, for a divided double chain wheel 1 which is intended for a double central scraper chain conveyor, the arrangement can be designed so that both chain star wheel parts 1A and 1B are fixedly attached to each other, optionally in one piece, so that the two chain wheel segments 1' and 1" can be installed and removed after loosening and removing the locking ring or locking rings in the manner described. However the division of the double chain wheel into two chain star wheel parts 1A and 1B which each consist of two chain wheel segments 1' and 1" as described above is preferred, since in this case the component parts of the chain wheel can be replaced independently of each other in the event of wear or other damage.

We claim:

1. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said chain wheel comprising shell-type chain wheel segments;

a feather key connection to rotatably lock said chain wheel segments to said shaft;

ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in a radial direction when detached; and gap ring seals disposed on the inside of said ring parts;

said chain wheel segments being removable from said shaft in a radial direction and disengaging said feather key connection when said at least one divided locking ring is removed from said shaft, each of said side cheeks of said machine frame provided with a fixed hollow journal projecting axially into an interior space thereof, said shaft being mounted with said shaft bearings in said hollow journals and said divided locking ring being disposed as an intermediate ring between a respective hollow journal and said chain wheel, said rotating sliding ring support coupled to said ring part by axial pegs or dowel pins, said ring part having a least one groove on its internal circumference and open towards the shaft for the engagement of said peg or dowel pin; said gap ring seals including sliding ring seals having a rotating sliding ring support disposed on and detachably locked in rotation to the respective ring part and rotates with said chain wheel, and a fixed sliding ring support disposed on said hollow journal.

2. A chain drum arrangement according to claim 1, wherein said ring parts are divided locking rings which rotate with the chain wheel.

3. A chain drum arrangement according to claim 1, wherein said divided locking ring comprises half ring segments which are detachably joined by a screwed connection comprising screws disposed approximately parallel to a tangent of said shaft.

4. A chain drum arrangement according to claim 1, wherein said chain wheel has lateral shoulders and said ring parts have annular retaining collars which fit round said lateral shoulders of said divided chain wheel.

5. A chain drum arrangement according to claim 4, wherein said shell-type chain wheel segments of said divided chain wheel are detachably joined to one another on said locking side of said chain wheel by a removable retaining ring, said retaining ring is covered by said retaining collar and said retaining ring and said retaining collar provided with cooperating formations to create a positive rotational attachment of these parts.

6. A chain drum arrangement according to claim 5, wherein said retaining ring provided with a tapered inner face, and a said lateral shoulder provided with a tapered supporting and wedging face for said retaining ring.

7. A chain drum arrangement according to claim 5, wherein said retaining ring is disposed on said lateral shoulder and is provided with an application face for a dismantling tool which can be placed thereon.

8. A chain drum arrangement according to claim 5, wherein said retaining ring is provided with tool insertion openings and/or with tapped holes for a pulling-off screw.

9. A chain drum arrangement according to claim 1, including gap ring seals disposed on the inside of said ring parts.

10. A chain drum arrangement according to claim 9, wherein said gap ring seals are sliding ring seals which are disposed on a sliding ring support on said ring parts.

11. A chain drum arrangement according to claim 1, wherein said at least one groove for the engagement of said peg or dowel pin is disposed in a plane of separation of said ring segments of said locking ring and is open towards the inside of said locking ring.

12. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said chain wheel comprising shell-type chain wheel segments;

a feather key connection to rotatably lock said chain wheel segments to said shaft;

ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in a radial direction when detached; and said chain wheel segments being removable from said shaft in a radial direction and disengaging said feather key connection when said at least one divided locking ring is removed from said shaft, said chain wheel having lateral shoulders and said ring parts having annular retaining collars which fit round said lateral shoulders of the divided chain wheel, said shell-type chain wheel segments of the divided chain wheel are detachably joined to one another on the locking ring side of said chain wheel by a removable retaining ring, said retaining ring is provided with tool insertion openings and/or with tapped holes for a pulling-off screw.

13. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said chain wheel comprising shell-type chain wheel segments;

a feather key connection to rotatably lock said chain wheel segments to said shaft;

ring parts disposed around said shaft on either side of said chain wheel to secure said chain wheel on said shaft, at least one of said ring parts being a divided locking ring, said divided locking ring rotating with said chain wheel and having locking ring segments which are detachable joined to each other and which can be removed from said shaft in a radial direction when detached; and said chain wheel segments being removable from said shaft in a radial direction and disengaging said feather key connection when said at least one divided locking ring is removed from shaft, said chain wheel having lateral shoulders and said ring parts having annular retaining collars which fit around said lateral shoulders of the divided chain wheel, said shell-type chain wheel segments of the divided chain wheel are detachably joined to one another on the locking ring side of said chain wheel by a removable retaining ring, said retaining ring covered by said retaining collar and said retaining ring and retaining collar are provided with cooperating formations which provides positive rotational attachment of these parts.

14. A chain drum arrangement according to claim 13, wherein said retaining ring is disposed on said annular lateral shoulder of said chain wheel over which said retaining collar of said ring part fits.

15. A chain drum arrangement according to claim 13, wherein said ring parts are divided locking rings which rotate with the chain wheel.

16. A chain drum arrangement according to claim 13, each of said side cheeks of said machine frames provided with a fixed hollow journal which projects axially into an interior space thereof, said shaft being mounted with said shaft bearings in said hollow journals and said divided locking ring being disposed as an intermediate ring between a respective hollow journal and said chain wheel.

17. A chain drum arrangement according to claim 13, wherein said divided locking ring comprises half ring segments which are detachably joined by a screwed connection comprising screws disposed approximately parallel to a tangent of said shaft.

18. A chain drum arrangement according to claim 13, wherein a plane of separation of said divided locking ring is displaced circumferentially in relation to a plane of separation of said divided chain wheel.

19. A chain drum arrangement according to claim 13, including gap ring seals disposed on the inside of said ring parts.

20. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said claim wheel comprising shell-type chain wheel segments;

a feather key connection to rotatably lock said chain wheel segments to said shaft;

ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in radial direction when detached; and said chain wheel segments being removable from said shaft in a radial direction and disengaging said feather key connection when said at least one divided locking ring is removed from said shaft, said chain wheel comprising two chain star wheel parts disposed on said shaft, each of said star wheels being formed from two shell-type chain wheel segments, said two chain star wheel parts being detachably locked together in the direction of rotation by an axial pinned or bolted connection, said chain star wheel parts including blind holes disposed on a common reference circle on their mutually facing side faces for the engagement of said axial pins.

21. A chain drum arrangement according to claim 20, wherein planes of separation of said two chain star wheel parts are displaced circumferentially in relation to each other.

22. A chain drum arrangement according to claim 20, wherein said two shell-type chain wheel segments of each chain star wheel part are of different arc lengths and have different numbers of teeth and the plane of separation of each chain star wheel part is a kinked plane of separation which form an obtuse angle, and said the plane of separation of each chain star wheel part cutting the surface of the chain wheel at tooth gaps between said teeth of the chain wheel.

23. A chain drum arrangement according to claim 20, wherein said chain wheel segments of said two chain star wheel parts are detachably joined at their mutually facing sides by retaining rings.

24. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said claim wheel comprising shell-type chain wheel segments;

a feather key connection to rotatably lock said chain wheel segments to said shaft;

ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in radial direction when detached; and said chain wheel segments being removable from said shaft in a radial direction and disengaging said feather key connection when said at least one divided locking ring is removed from said shaft, said chain wheel having lateral shoulders and said ring parts having annular retaining collars which fit round said lateral shoulders of the divided chain wheel, said shell-type chain wheel segments of the divided chain wheel detachably joined to one another on the locking ring side of said chain wheel by a removable retaining ring, said retaining ring being disposed on said lateral shoulder and provided with an application face for a dismantling tool which can be placed thereon.

25. A chain drum arrangement according to claim 24 wherein said application face being an external edge chamfer of the retaining ring inner edge.

26. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said claim wheel comprising shell-type chain wheel segments;

a feather key connection to rotatably lock said chain wheel segments to said shaft;

ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in radial direction when detached; and said chain wheel segments being removable from said shaft in a radial direction and disengaging said feather key connection when said at least one divided locking ring is removed from said shaft, said ring parts disposed on either side of said chain wheel provided on outer faces facing an adjacent one of said shaft bearings with radially outwardly ascending wedge contact faces which are supported and wedged against a shaft collar or the like.

27. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said claim wheel comprising shell-type chain wheel segments;

a feather key connection to rotatably lock said chain wheel segments to said shaft;

ring parts disposed around said shaft on either side of said chain wheel to secure said chain wheel on shaft, at least one of said ring parts being a divided locking ring, said divided locking ring rotating with said chain wheel and having locking ring segments which are detachably joined to each other and which can be removed from said shaft in radial direction when detached; and said chain wheel segments being removable from said shaft in a radial direction and disengaging said feather key connection when said at least one divided locking ring is removed from said shaft, said dividing locking ring is provided with a flexible seal which is disposed between its said ring segments.

28. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said claim wheel comprising shell-type chain wheel segments;

a feather key connection to rotatably lock said chain wheel segments to said shaft;

ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in radial direction when detached;

a flexible flat seal is disposed between said chain wheel segments on a plane of separation thereof; and said chain wheel segments being removable from said shaft in a radial direction and disengaging said feather key connection when said at least one divided locking ring is removed from said shaft.

29. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said chain wheel comprising shell-type chain wheel segments;

ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in radial direction when detached;

said shell-type chain wheel segments of the divided chain wheel being detachably joined to one another on the locking ring side of said chain wheel by a removable retaining ring, said chain wheel has lateral shoulders and said ring parts have annular retaining collars which fit round lateral shoulders of said divided chain wheel.

30. A chain drum arrangement according to claim 29, wherein said retaining ring is disposed on said annular lateral shoulder of said chain wheel over which said retaining collar of said ring part fits.

31. A chain drum arrangement according to claim 29, wherein said retaining ring provided with a tapered inner face and a said lateral shoulder associated therewith, said lateral shoulder provided with a tapered supporting and wedging face for the retaining ring.

32. A chain drum arrangement according to claim 29, wherein both of said ring parts are divided locking rings which rotate with said chain wheel.

33. A chain drum arrangement according to claim 29, wherein said side cheeks of said machine frame are each provided with a fixed hollow journal which projects axially into an interior space thereof, said shaft being mounted with said shaft bearings in said hollow journals and said divided locking ring being disposed as an intermediate ring between said hollow journal and said chain wheel.

34. A chain drum arrangement according to claim 33, including gap ring seals disposed on the inside of said ring parts, said gap ring seals include a sliding ring seal having a rotating sliding ring support disposed on and detachably locked in rotation to the respective ring part and rotates with said chain wheel, and a fixed sliding ring support disposed on said hollow journal.

35. A chain drum arrangement according to claim 29, wherein a plane of separation of said divided locking ring is displaced circumferentially in relation to a plane of separation of said divided chain wheel.

36. A chain drum arrangement according to claim 29, including gap ring seals disposed on the inside of said ring parts, said gap ring seals include a sliding ring seal.

37. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said chain wheel comprising shell-type chain wheel segments; and ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in radial direction when detached;

said chain wheel comprises two chain star wheel parts which are disposed side by side on said shaft, each of said star wheels being formed from two shell-type chain wheels segments the planes of separation of said two chain star wheel parts are displaced circumferentially in relation to each other.

38. A chain drum arrangement according to claim 37, wherein said two shell-type chain wheel segments of each chain star wheel part are of different arc lengths and have different numbers of teeth and the plane of separation of each chain star wheel part is a kinked plane of separation which form obtuse angle, and wherein the plane of separation of each chain star wheel part cutting the surface of the chain wheel at tooth gaps between teeth of said chain wheel.

39. A chain drum arrangement according to claim 37, wherein said chain wheel segments of said two chain star wheel parts are detachably joined at their mutually facing sides by retaining rings.

40. A chain drum arrangement according to claim 37, wherein said retaining ring is provided with a tapered inner face and a said lateral shoulder, said lateral shoulder provided with a tapered supporting and wedging face for the retaining ring.

41. A chain drum arrangement according to claim 37, wherein said ring parts being divided locking rings which rotate with the chain wheel.

42. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said chain wheel comprising shell-type chain wheel segments; and ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in radial direction when detached;

said chain wheel comprises two chain star wheel parts which are disposed side by side on said shaft, each of said star wheels being formed from two shell-type chain wheels segments, said two chain star wheel parts are detachably locked together in the direction of rotation by an axial pinned or bolted connection.

43. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said chain wheel comprising shell-type chain wheel segments; and ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in radial direction when detached;

said chain wheel comprises two chain star wheel parts which are disposed side by side on said shaft, each of said star wheels being formed from two shell-type chain wheels segments, said chain wheel has lateral shoulders and said ring parts have annular retaining collars which fit round said lateral shoulders of the divided chain wheel.

44. A chain drum arrangement for central or double central scraper chain conveyors having a machine frame with side cheeks comprising bearing parts, the chain drum arrangement comprising:

a shaft;

shaft bearings for mounting said shaft on said bearing parts of said machine frame;

a divided chain wheel mounted on said shaft, said chain wheel comprising shell-type chain wheel segments; and ring parts disposed around said shaft on either side of said chain wheel to secure said chain wheel on said shaft, at least one of said ring parts being a divided locking ring, said divided locking ring rotating with said chain wheel and having locking ring segments which are detachably joined to each other and which can be removed from said shaft in radial direction when detached;

said chain wheel comprises two chain star wheel parts which are disposed side by side on said shaft, each of said star wheels being formed from two shell-type chain wheels segments, a plane of separation of said divided locking rings are displaced circumferentially in relation to a plane of separation of said divided chain wheel.

* * * * *